US010667016B2

(12) United States Patent
Hyun et al.

(10) Patent No.: US 10,667,016 B2
(45) Date of Patent: May 26, 2020

(54) PEER AND METHOD FOR ADJUSTING STARTING POINT OF THE PEER

(71) Applicant: Electronics and Telecommunications Research Institute, Daejeon (KR)

(72) Inventors: Wook Hyun, Daejeon (KR); Changkyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 166 days.

(21) Appl. No.: 16/010,662

(22) Filed: Jun. 18, 2018

(65) Prior Publication Data

US 2018/0367866 A1  Dec. 20, 2018

(30) Foreign Application Priority Data

Jun. 19, 2017  (KR) .................. 10-2017-0077317
Apr. 10, 2018  (KR) .................. 10-2018-0041481

(51) Int. Cl.
*H04N 21/63* (2011.01)
*H04N 21/435* (2011.01)
(Continued)

(52) U.S. Cl.
CPC ......... *H04N 21/632* (2013.01); *H04L 67/104* (2013.01); *H04N 21/435* (2013.01)

(58) Field of Classification Search
CPC ...... H04N 21/63; H04N 21/435; H04L 65/60; G06F 15/16
See application file for complete search history.

(56) References Cited

U.S. PATENT DOCUMENTS 8,082,356 B2  12/2011  Wu et al.
2007/0094405 A1*  4/2007  Zhang .............. H04N 21/2187
                                           709/231
(Continued)

FOREIGN PATENT DOCUMENTS

KR  10-1590098  1/2016

OTHER PUBLICATIONS

Friedman, Libov and Vigfusson; "Distilling the Ingredients of P2P Live Streaming Systems" Sep. 21-25, 2015; IEEE Xplore Nov. 16, 2015. (Year: 2015).*

*Primary Examiner* — Kevin T Bates
*Assistant Examiner* — Mark A Scott
(74) *Attorney, Agent, or Firm* — Kile Park Reed & Houtteman PLLC

(57) ABSTRACT

Disclosed is a method of adjusting a starting point of a peer, the method including receiving a starting point value and a downloading point value of a counterpart peer from the counterpart peer, determining an initial starting point value of a peer based on the received starting point value and the received downloading point value, calculating a ratio between an average play point move rate (APMR) of the peer and an average fragment reception rate of the peer when the determined initial starting point value is less than the received starting point value, calculating a margin based on the calculated ratio, and determining the starting point value of the peer using one of the received starting point value and the received downloading point value, and the calculated margin.

12 Claims, 6 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 2008/0037527 A1* | 2/2008 | Chan | H04L 67/104 370/353 |
| 2008/0256255 A1* | 10/2008 | Mordovskoi | H04N 21/2381 709/231 |
| 2008/0281913 A1* | 11/2008 | Shankar | H04N 7/17354 709/204 |
| 2009/0144441 A1* | 6/2009 | LoGalbo | H04L 65/4046 709/235 |
| 2010/0146138 A1* | 6/2010 | Ng | H04L 65/80 709/231 |
| 2011/0113099 A1* | 5/2011 | Teng | H04L 67/1093 709/205 |
| 2011/0219138 A1* | 9/2011 | Cho | H04L 67/104 709/231 |
| 2011/0258338 A1* | 10/2011 | Vass | H04N 7/148 709/233 |
| 2012/0110609 A1* | 5/2012 | Guo | H04N 21/234327 725/14 |
| 2012/0117605 A1* | 5/2012 | Miao | H04L 65/4084 725/115 |
| 2012/0246332 A1* | 9/2012 | Lee | H04L 65/4076 709/231 |
| 2012/0317197 A1* | 12/2012 | De Foy | H04L 67/1063 709/204 |
| 2013/0275615 A1* | 10/2013 | Oyman | H04L 65/60 709/231 |
| 2014/0019543 A1 | 1/2014 | Hyun et al. | |
| 2014/0173055 A1* | 6/2014 | Yu | H04L 65/607 709/219 |
| 2014/0280563 A1* | 9/2014 | El-Beltagy | H04L 67/1068 709/204 |
| 2015/0023342 A1* | 1/2015 | Joo | H04W 56/0035 370/350 |
| 2015/0039726 A1* | 2/2015 | Hoffert | H04L 65/60 709/219 |
| 2015/0058907 A1* | 2/2015 | Picconi | H04L 67/104 725/116 |
| 2015/0124581 A1* | 5/2015 | Yeom | H04L 65/4084 370/216 |
| 2016/0086175 A1* | 3/2016 | Finlow-Bates | H04L 9/3271 705/77 |
| 2016/0197731 A1* | 7/2016 | Hyun | H04L 9/3247 713/176 |
| 2016/0234303 A1* | 8/2016 | Liu | H04L 65/42 |
| 2016/0337426 A1* | 11/2016 | Shribman | H04L 65/4084 |
| 2017/0063643 A1* | 3/2017 | Lee | H04L 67/104 |
| 2017/0063981 A1* | 3/2017 | Hyun | H04L 43/0817 |

\* cited by examiner

PEER AND METHOD FOR ADJUSTING STARTING POINT OF THE PEER

CROSS-REFERENCE TO RELATED APPLICATION(S)

This application claims the priority benefit of Korean Patent Application No. 10-2017-0077317 filed on Jun. 19, 2017 and Korean Patent Application No. 10-2018-0041481 filed on Apr. 10, 2018, in the Korean Intellectual Property Office, the disclosures of which are incorporated herein by reference for all purposes.

BACKGROUND

1. Field

One or more example embodiments relate to a peer and a method of adjusting a start point of the peer.

2. Description of Related Art

In the case of peer-to-peer (P2P) streaming based on a mesh, a buffermap of each peer or each terminal varies due to P2P properties.

A peer does not receive a buffermap from a tracker server and receives the buffermap from another peer. Therefore, a peer newly participating in a network sets a starting point based on a buffermap of a counterpart peer that is initially connected to the network. When accessing the counterpart peer, the peer requests a chunk corresponding to a size of the buffermap of the peer based on the starting point set by the peer.

When setting the starting point of the buffermap of the peer using a significantly older value, the peer may not find a desirable chunk in the buffermap of the counterpart peer and not receive a newly generated chunk. Also, when a bitrate of an image is relatively high, a generation rate of a chunk increases, which leads to increasing a sliding rate of the buffermap of the peer.

When the buffermap of the peer does not move based on an actual image rate, the peer may become an orphan in an overlay network from a specific point in time, and the peer may not receive new data from other peers. Also, the peer that became the orphan may transmit a wrong starting point to at least one peer that is initially connected to the peer, and thereby the at least one peer may become an orphan.

SUMMARY

According to an aspect of at least one example embodiment, there is provided a method of adjusting a starting point of a peer, the method including receiving a starting point value and a downloading point value of a counterpart peer from the counterpart peer, determining an initial starting point value of a peer based on the received starting point value and the received downloading point value, calculating a ratio between an average play point move rate (APMR) of the peer and an average fragment reception rate of the peer when the determined initial starting point value is less than the received starting point value, calculating a margin based on the calculated ratio, and determining the starting point value of the peer using one of the received starting point value and the received downloading point value, and the calculated margin.

The determining of the initial starting point value may include calculating a difference value between the received downloading point value and the received starting point value and multiplying a greater value between the calculated difference value and a first constant value by a second constant value, and rounding off the multiplication result and determining a difference value between the received downloading point value and the rounded-off result as the initial starting point value.

The first constant value may be 1 and the second constant value may be 0.5.

The calculating of the margin may include calculating a difference value between the received downloading point value and the received starting point value, and multiplying the calculated difference value and the calculated ratio, rounding off a greater value between the multiplication result and a third constant value, and determining the rounded-off result as the margin.

The third constant value may be 1.

The determining of the starting point value may include determining the starting point value to be close to the received downloading point value between the received starting point value and the received downloading point value when the average fragment reception rate is greater than a threshold value, and a difference between the determined starting point value and the received downloading point value may correspond to the calculated margin.

The determining of the starting point value may include determining the starting point value to be close to the received starting point value between the received starting point value and the received downloading point value when the average fragment reception rate is less than or equal to a threshold value, and a difference between the determined starting point value and the received starting point value may correspond to the calculated margin.

The determining of the starting point value may include determining a subtraction result obtained by subtracting the calculated margin from the received downloading point value as the starting point value when the average fragment reception rate is greater than a threshold value, and determining an addition result obtained by adding the calculated margin to the received starting point value as the starting point value when the average fragment reception rate is less than or equal to the threshold value.

The APMR may be associated with a generation rate of fragments.

According to another aspect of at least one example embodiment, there is provided a peer including a communication interface, and a processor configured to receive a starting point value and a downloading point value of a counterpart peer from the counterpart peer through the communication interface, determine an initial starting point value of a peer based on the received starting point value and the received downloading point value, calculate, when the determined initial starting point value is less than the received starting point value, a ratio between an APMR of the peer and an average fragment reception rate of the peer, calculate a margin based on the calculated ratio, and determine a starting point value of the peer using one of the received starting point value and the received downloading point value and the calculated margin.

The processor may be configured to calculate a difference value between the received downloading point value and the received starting point value, multiply a greater value between the calculated difference value and a first constant value by a second constant value, round off the multiplication result, and determine a difference value between the received downloading point value and the rounded-off result as the initial starting point value.

The first constant value may be 1 and the second constant value may be 0.5.

The processor may be configured to calculate a difference value between the received downloading point value and the received starting point value, multiply the difference value and the calculated ratio, round off a greater value between the multiplication result and a third constant value, and determine the rounded-off result as the margin.

The third constant value may be 1.

The processor may be configured to determine the received starting point value to be close to the received downloading point value between the received starting point value and the received downloading point value when the average fragment reception rate is greater than a threshold value, and a difference between the determined starting point value and the received downloading point value may correspond to the calculated margin.

The processor may be configured to determine the starting point value to be close to the received starting point value between the received starting point value and the received downloading point value when the average fragment reception rate is less than or equal to a threshold value, and a difference between the determined starting point value and the received starting point value may correspond to the calculated margin.

The processor may be configured to determine a subtraction result obtained by subtracting the calculated margin from the received downloading point value as the starting point value when the average fragment reception rate is greater than a threshold value, and the processor may be configured to determine an addition result obtained by adding the calculated margin to the received starting point value as the starting point value when the average fragment reception rate is less than or equal to the threshold value.

The APMR may be associated with a generation rate of fragments.

According to some example embodiments, a peer may readjust a starting point when a starting point value of the peer is behind during a buffermap negotiation between the peer and a counterpart peer. Thus, a probability that the peer may become an orphan in a network may decrease. Also, a playtime of each peer terminal may be synchronized using a readjusting function.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
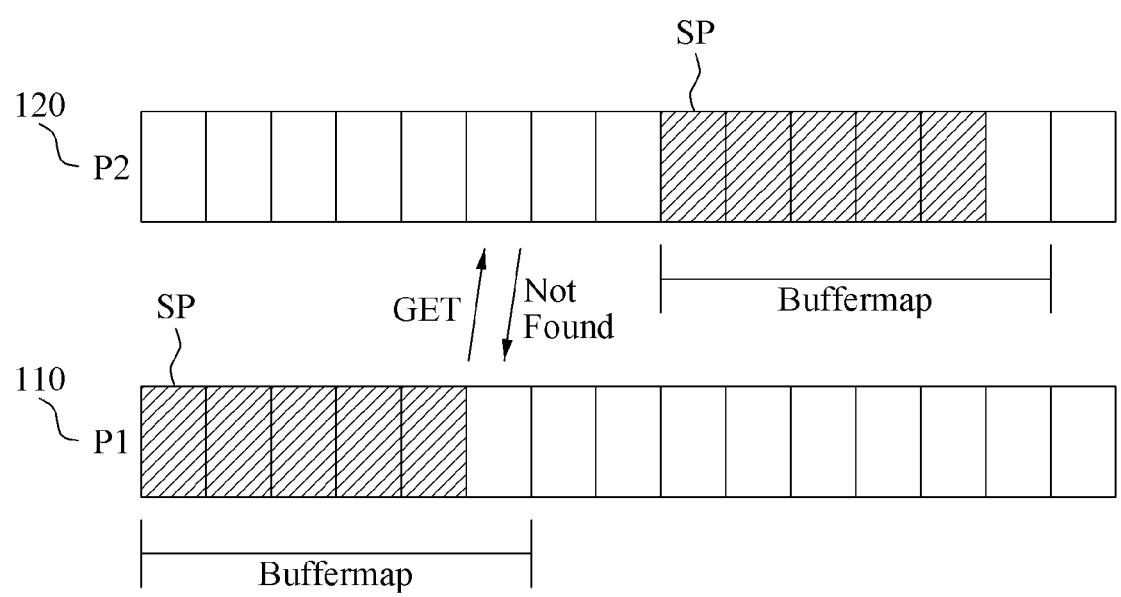
FIG. 1 is a diagram illustrating a starting point (SP) of a peer according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Prior to a detailed description, a buffermap will be described. The buffermap includes a completed section, a downloading section, and an empty section.

The completed section indicates a section with fragments that a peer possesses continuously.

The downloading section indicates a section with fragments that a peer does not possess continuously.

The empty section indicates a section to be used for buffering to prevent a downloading point (DP) from overriding a starting point (SP).

The buffermap has the following attributes that indicate specific fragment identifiers.

A completed point (CP): A CP value indicates an end of the completed section in the buffermap. That is, the CP corresponds to the end of the completed section.

A downloading point (DP): A DP value indicates an end of the downloading section in the buffermap. That is, the DP corresponds to the end of the downloading section.

A starting point (SP): An SP value indicates an identifier at a beginning of the buffermap. That is, the SP corresponds to the beginning of the buffermap.

A play point (PP): A PP value indicates an identifier that is passed to a player in the buffermap. The PP is used for a flow control with other peers.

An end point (EP) indicates an end of the empty section.

FIG. 1 is a diagram illustrating an SP of a peer according to an example embodiment.

Referring to FIG. 1, a buffermap of a peer P2 120 may be ahead of a buffermap of a peer P1 110. That is, an SP of the peer P1 110 may be ahead of an SP of the peer P2 120. In this case, the peer P1 110 may not find a desired chunk corresponding to a size of the buffermap of the peer P1 110 in the buffermap of the peer P2 120 although the peer P1 110 requests the peer P2 120 for the desired chunk based on the SP of the peer P1 110 through connection to the peer P2 120. Also, the peer P1 110 may not receive a newly generated chunk from the peer P2 120.

Also, the peer P1 110 may become an orphan in an overlay network from a specific point in time if the buffermap of the peer P2 120 is ahead of the buffermap of the peer P1 110 and the buffermap of the peer P1 110 does not move, that is, slide, based on an image rate. In this case, the peer P1 110 may not receive data from other peers as well as the peer P2 120. Also, the peer P1 110 that becomes the orphan may transmit a wrong SP to at least one third peer connected to the peer P1 110. Thus, the at least one third peer may become an orphan in the overlay network.

According to an example embodiment, the peer P1 110 may outperform the aforementioned issues by adjusting the SP of the peer P1 110. Hereinafter, examples of adjusting the SP adjustment of the peer P1 110 will be described with reference to FIGS. 2 through 4.

Figure 2:
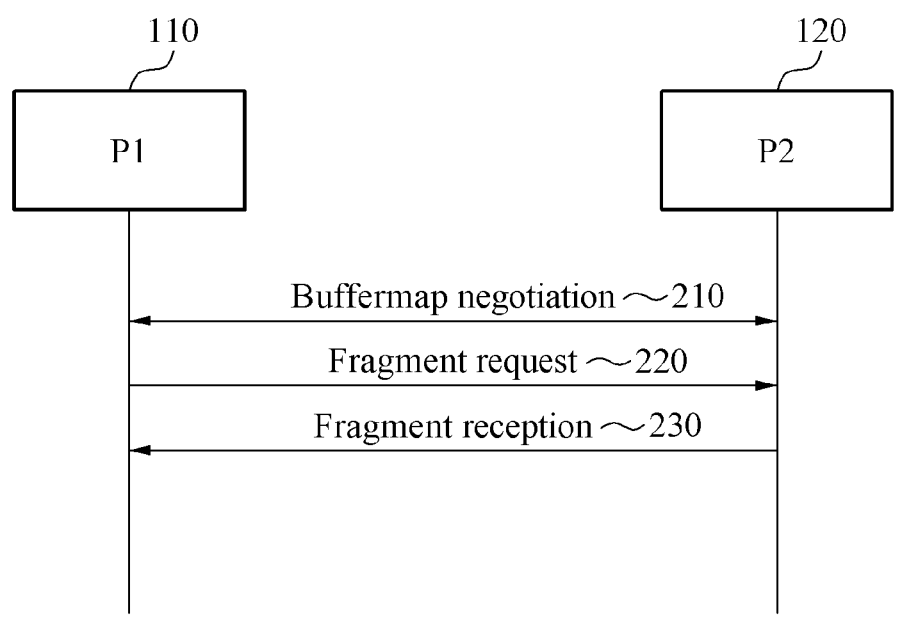
FIGS. 2 through 4 illustrate examples of adjusting an SP of a peer according to an example embodiment.
Figure 3:
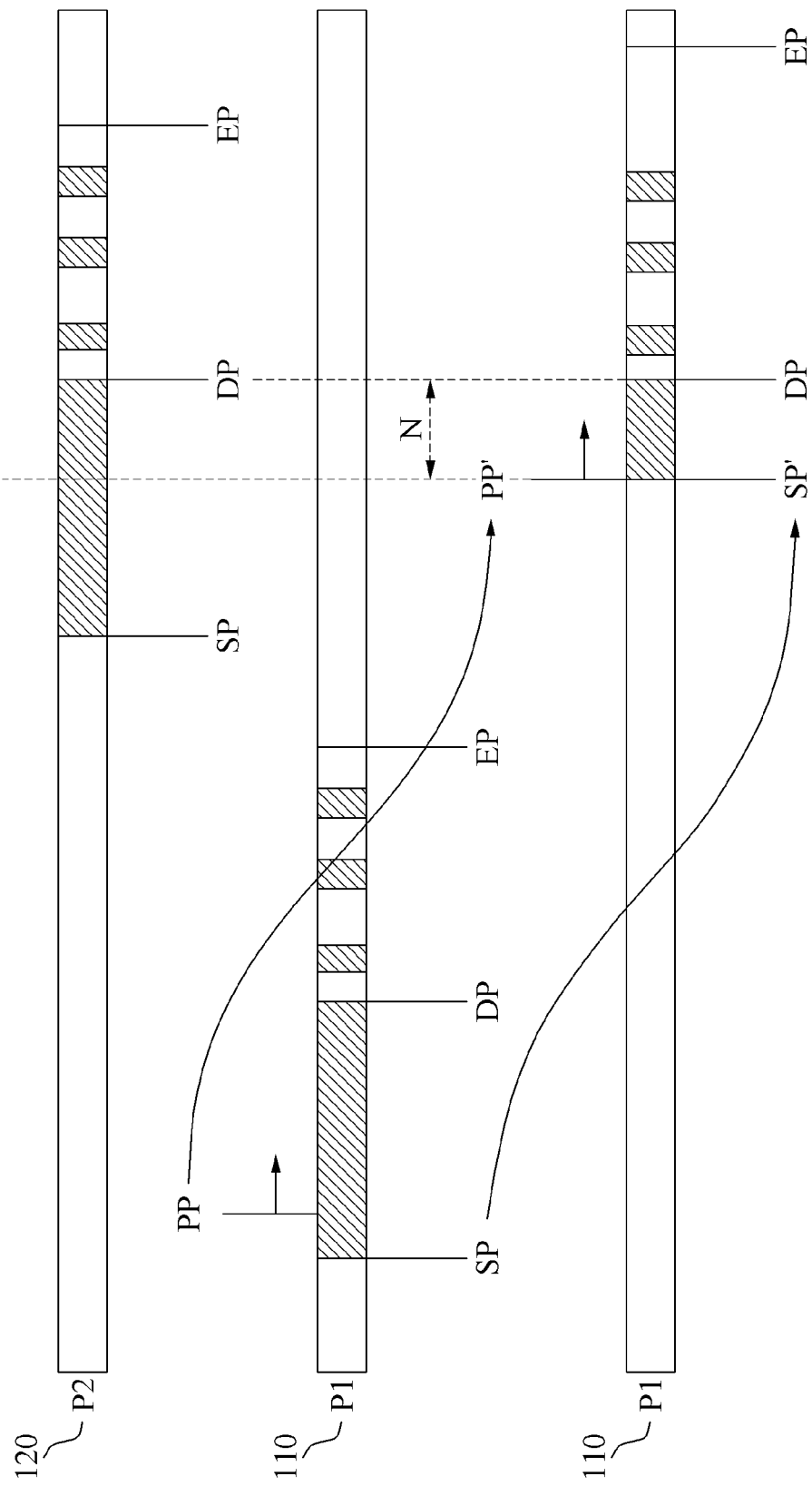
Figure 4:
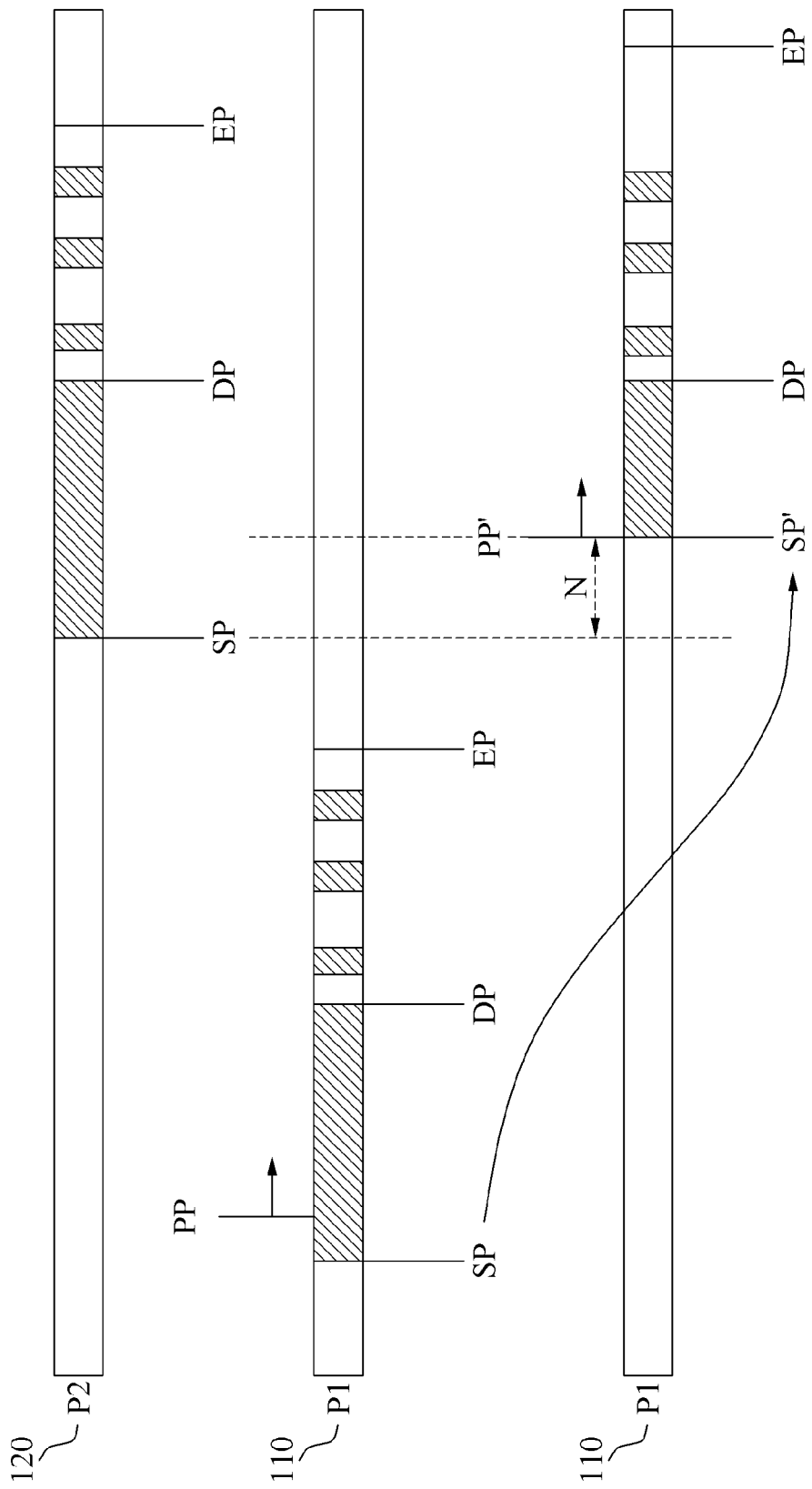

FIGS. 2 through 4 illustrate examples of adjusting an SP of a peer according to an example embodiment.

Referring to FIG. 2, in operation 210, the peer P1 110 may perform a buffermap negotiation with the peer P2 120. Here, the peer P1 110 may receive an SP value and a DP value of the peer P2 120 from the peer P2 120. If an SP value of the peer P1 110 is less than that of the peer P2 120, a new SP value that is an SP' value may be determined. If the peer P1 110 is initially executed, the SP value of the peer P1 110 is not set, and buffermap time table (BTT) information is absent, the peer P1 110 may determine an initial SP value of the peer P1 110 based on the SP value and the DP value of the peer P2 120. For example, the peer P1 110 may determine the initial value of the peer P1 110 according to the following Equation 1.

$$mySP\_ini = peerDP - ROUND[\tfrac{1}{2} \times \max\{(peerDP-peerSP),1\}]$$ [Equation 1]

In Equation 1, mySP_ini denotes the initial SP value of the peer P1 110, peerDP denotes the DP value of the peer P2 120, and peerSP denotes the SP value of the peer P2 120. Also, max denotes an operator that selects a greater value between a difference value between peerDP and peerSP and 1, and ROUND denotes a round-off operator. For example, if 1 is greater than the difference value between peerDP and peerSP, mySP_ini may be determined as a difference value between peerDP and ROUND[½×1]. That is, mySP_ini may be determined as peerDP−1.

If the initial SP value of the peer P1 110 is less than the SP value of the peer P2 120, the peer P1 110 may newly determine the SP' value instead of using the initial SP value.

Hereinafter, a method of determining, by the peer P1 110, the SP' value will be described.

Here, mySP denotes the SP value of the peer P1 110.

If mySP is less than peerSP, the peer P1 110 may determine the SP' value according to the following Equation 2.

$$R = APMrate/ADrate; /*(0<R<1)*/$$

$$N = ROUND[\max\{(peerDP-peerSP) \times R, 1\}];$$

if (ADrate>Limit)mySP=peerDP−N;

else mySP=peerSP+N; [Equation 2]

In Equation 2, APMrate is an abbreviation for an average play point move rate and denotes an average move rate of a PP of the peer P1 110, and ADrate is an abbreviation for an average download rate and denotes an average fragment reception rate of the peer P1 110. The peer P1 110 may estimate APMrate using a generation speed of fragments since APMrate is almost similar to the generation speed of fragments.

Once the peer P1 110 calculates a ratio R between APMrate and ADrate, the peer P1 110 determines a margin N. Referring to Equation 2, the peer P1 110 may determine the margin N by rounding off a greater value between a result obtained by multiplying (peerDP-peerSP) by the ratio R and 1.

Once the margin N is determined, the peer P1 110 may compare ADrate to a threshold value Limit. For example, the threshold value Limit may be calculated based on an average consumption rate (APrate).

If ADrate is greater than Limit, the peer P1 110 may determine peerDP−N as the SP' value. That is, if ADrate is greater than Limit, the peer P1 110 may determine the SP' value as a value of a point close to peerDP. Here, a difference value between the value of the point close to peer DP and peerDP corresponds to the margin N.

FIG. 3 illustrates a case in which ADrate is greater than Limit. Referring to FIG. 3, the peer P1 110 may determine peerDP−N as the SP' value. If the SP' value is significantly close to peer DP, the peer P1 110 may not possess a fragment at a point in time at which the fragment is to be played. To prevent or minimize the occurrence of the above issue, the peer P1 110 may determine a difference value between peer DP and an appropriately calculated buffer interval N as the SP' value. Here, the buffer interval N of FIG. 3 corresponds to the margin N of Equation 2.

If ADrate is less than or equal to Limit, the peer P1 110 may determine peerSP+N as the SP' value. That is, if ADrate is less than or equal to Limit, the peer P1 110 may determine the SP' value as a value of a point close to peerSP. Here, a difference value between the value of the point close to peerSP and peerSP corresponds to the margin N.

FIG. 4 illustrates a case in which AD rate is less than or equal to Limit. Referring to FIG. 4, the peer P1 110 may determine peerSP+N as the SP' value. When the peer P1 110 uses the SP value of the peer P2 120 as is, the SP of the peer P2 120 may move during a buffermap adaptation. In this case, the peer P2 120 may not transmit a fragment corresponding to the SP' value of the peer P1 110 to the peer P1 110 although the peer P1 110 requests the peer P2 120 for the fragment. To prevent or minimize the occurrence of this issue, the peer P1 110 may set a result obtained by adding peerSP and the appropriately calculated margin N as the SP' value.

Once the SP' value is determined, the peer P1 110 requests the peer P2 120 for a fragment or a chunk to based on the SP' n operation 220.

In operation 230, the P1 110 receives the fragment or the chunk from the peer P2 120.

Accordingly, the peer P1 110 may play an image at an appropriate point in time during streaming.

Figure 5:
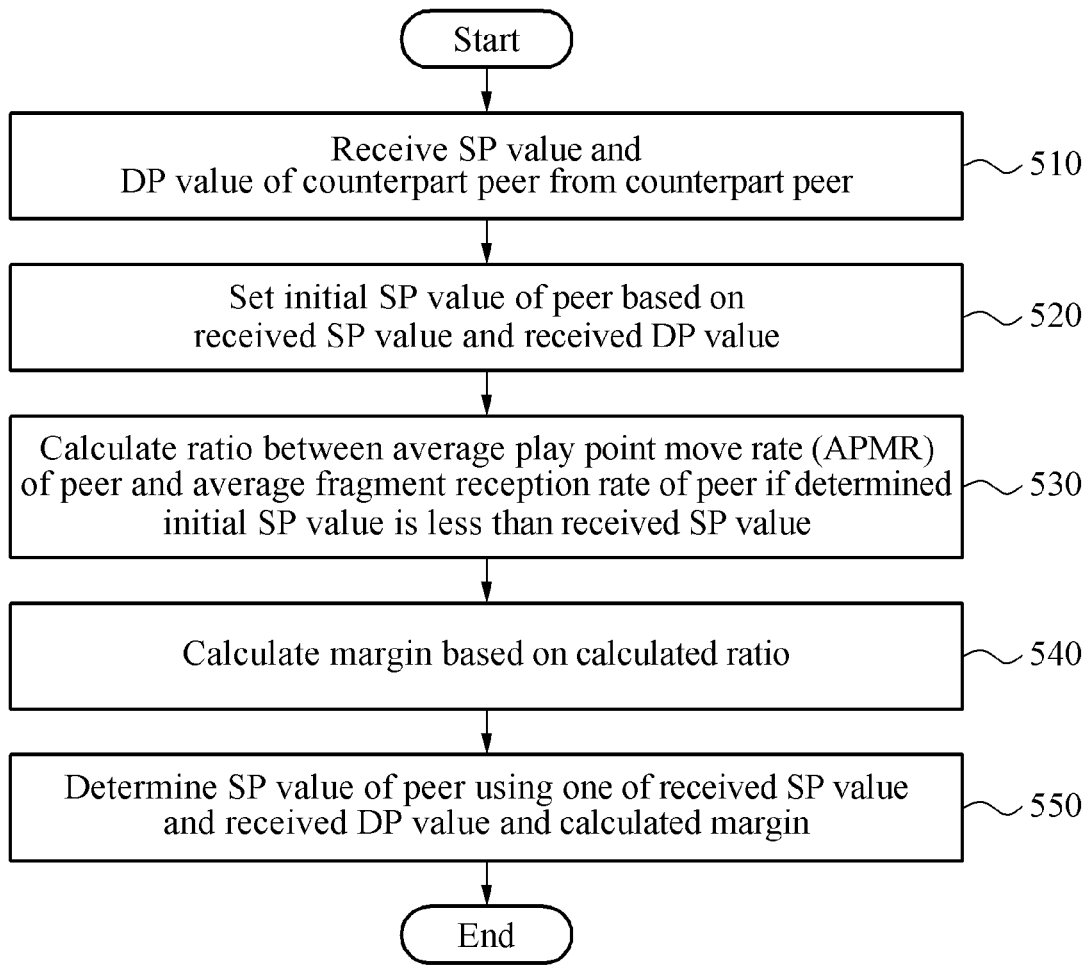
FIG. 5 is a flowchart illustrating a method of adjusting an SP of a peer according to an example embodiment.

FIG. 5 is a flowchart illustrating a method of adjusting an SP of a peer according to an example embodiment. In FIG. 5, a peer refers to the peer P1 110 and a counterpart peer refers to the peer P2 120.

Referring to FIG. 5, in operation 510, the peer may receive an SP value and a DP value of the counterpart peer from the counterpart peer. The peer may receive the SP value and the DP value of the counterpart peer from the counterpart peer during a buffermap negotiation between the peer and the counterpart peer.

In operation 520, the peer may determine an initial SP value of the peer based on the received SP value and the received DP value. Operation 520 may correspond to a process in which the peer P1 110 calculates mySP_ini of Equation 1.

In operation 530, the peer may calculate a ratio between an average play point move rate (APMR) of the peer and an average fragment reception rate of the peer if the determined initial SP value is less than the received SP value. The ratio calculated in operation 530 may correspond to the ratio R of Equation 2.

In operation 540, the peer may calculate a margin based on the calculated ratio. The margin calculated in operation 540 may correspond to the margin N of Equation 2.

In operation 550, the peer may determine the SP value of the peer using one of the received SP value and the received DP value, and the calculated margin. For example, the peer may determine a value obtained by subtracting the margin from the received DP value as the SP value of the peer if the average fragment reception rate is greater than the threshold value Limit. The peer may determine a value obtained by adding the received SP value by the margin as the SP value of the peer if the average fragment reception rate is less than or equal to the threshold value Limit. The SP value determined in operation 550 may correspond to the aforementioned SP' value.

The description made above with reference to FIGS. 1 through 4 may be applied to FIG. 5. Thus, a further description will be omitted.

Figure 6:
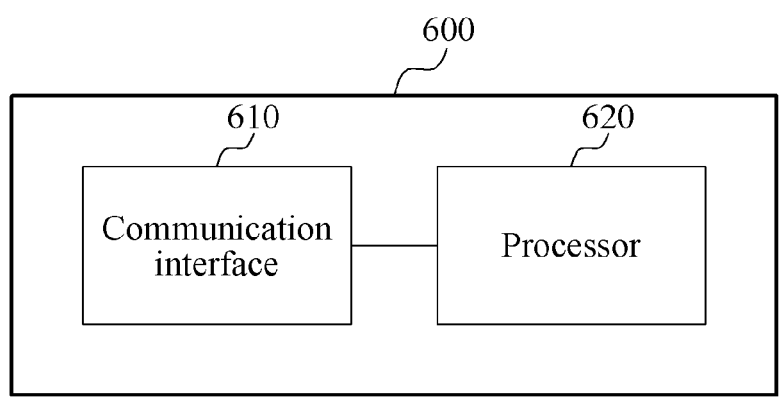
FIG. 6 is a block diagram illustrating a peer according to an example embodiment.

FIG. 6 is a block diagram illustrating a peer according to an example embodiment.

Referring to FIG. 6, a peer 600 may include a communication interface 610 and a processor 620. Here, the peer 600 refers to the peer P1 110, and a counterpart peer refers to the peer P2 120.

The processor 620 may receive an SP value and a DP value of the counterpart peer from the counterpart peer using the communication interface 610.

The processor 620 may determine an initial SP value of the peer 600 based on the received SP value and the received DP value.

The processor 620 may calculate a ratio between an APMR of the peer 600 and an average fragment reception rate of the peer 600 if the determined initial SP value is less than the received SP value.

The processor 620 may calculate a margin based on the calculated ratio.

The processor 620 may determine an SP value of the peer using one of the received SP value and the received DP value and the calculated margin.

The description made above in FIGS. 1 through 5 may be applied to the description made in FIG. 6. Thus, a detailed description will be omitted.

In one embodiment, if the buffermap of the current negotiating peer is ahead of the local buffermap, it moves the SP of the peer forward. As shown in the FIG. 3 and FIG. 4, if the buffermap of the corresponding peer is ahead of the buffermap of P1, the SP of this peer is moved to SP' and the buffermap of P1 is moved accordingly. If real-time performance is important, such as live broadcasting, it is necessary to adjust the SP' to indicate latest value as much as possible as shown in FIG. 4. If it is important to provide smooth service rather than real-time performance, readjust the SP' to the section where enough pieces are secured as shown in FIG. 3.

Because of the nature of streaming, the buffermap continues to move with time, if the SP value of the corresponding peer is used as the SP of the local buffer map, the fragment corresponding to the SP may not be included in the buffermap as it moves during buffermap adaptation. Therefore, it is necessary to set the value of SP' by jumping an appropriate interval (N) in order to prevent this situation from occurring.

In addition, if the SP' is set too close to peerDP, there is a high probability that the fragments will not be retained at the required time. Therefore, it is necessary to have some margin in setting the SP' value.

For a dynamic and autonomous decision of the SP, it needs to flexibly derive the SP' value by taking into consideration average play point move rate (APMR) and average download rate (ADR). Because APMR is almost the same as the generation rate of fragments, it is possible to deduce the reproduction bitrate of the media using APMR and ADR. That is, the combination of these values can determine the optimal value suited to the multimedia characteristics of the session in consideration of the network situation.

If mySP is not yet set, the SP value is calculated as follows:

$$SP = peerDP - ROUND[½ \times max\{(peerDP - peerSP), 1\}]$$

If myEP is smaller than peerSP, the SP' value is recalculated as follows;

$$R = APMR/ADR; /*(0 < R < 1)*/$$

$$N = ROUND[max\{(peerDP - peerSP) \times R, 1\}];$$

$$\text{if } (ADR > Limit) SP' = peerDP - N;$$

$$\text{else } SP' = peerSP + N;$$

If the ADR is higher than a pre-specified limit, the SP' is set at a point close to the peerDP. If the ADR is lower than the limit, the value is determined at a point close to the peerSP, so that the stability and real-time characteristics of the service can be flexibly selected. The limit value is calculated by use of APMR.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magnetooptical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of adjusting a starting point of a peer, the method comprising:
    obtaining a starting point value of a corresponding peer and a downloading point value of the corresponding peer; and
    adjusting a starting point value of the peer if an end point of an empty section of a buffermap of the peer is smaller than the obtained starting point value,
    wherein the adjusting comprises:
    calculating a ratio between an average play point move rate (APMR) of the peer and an average download rate (ADR) of the peer;
    determining an interval based on the calculated ratio; and
    determining the starting point value of the peer based on the obtained downloading point value and the determined interval if the ADR is higher than a pre-specified limit, and determining the starting point value of the peer based on the obtained starting point value and the determined interval if the ADR is lower than the pre-specified limit.

2. The method of claim 1, wherein the determing of the interval comprises:
    calculating a difference value between the obtained downloading point value and the obtained starting point value, and multiplying the calculated difference value and the calculated ratio;
    rounding off a greater value between the multiplication result and a constant value; and
    determining the rounded-off result as the interval.

3. The method of claim 2, wherein the constant value is 1.

4. The method of claim 1, wherein the determining of the starting point value of the peer based on the obtained downloading point value and the determined interval comprises determining a difference between the obtained downloading point value and determined interval as the starting point value of the peer.

5. The method of claim 1, wherein the determining of the starting point value of the peer based on the obtained starting point value and the determined interval comprises determining a sum of the obtained starting point value and the determined interval as the starting point value of the peer.

6. The method of claim 1, wherein the APMR is associated with a generation rate of fragments.

7. A peer comprising:
    a processor configured to:
    obtain a starting point value of a corresponding peer and a downloading point value of the corresponding peer,
    if an end point of an empty section of a buffermap of the peer is smaller than the received starting point value;
    calculate a ratio between an APMR of the peer and an ADR of the peer,
    determine a interval based on the calculated ratio, and
    determine a starting point value of the peer based on the obtained downloading point value and the determined interval if the ADR is higher than a pre-specified limit, and determine the starting point value of the peer based on the obtained starting point value and the determined interval if the ADR is lower than the pre-specified limit.

8. The peer of claim 7, wherein the processor is further configured to calculate a difference value between the obtained downloading point value and the obtained starting point value, multiply the difference value and the calculated ratio, round off a greater value between the multiplication result and a constant value, and determine the rounded-off result as the interval.

9. The peer of claim 8, wherein the constant value is 1.

10. The peer of claim 7, wherein the processor is further configured to determine the a difference between the obtained downloading point value and the determined interval as the starting point value of the peer if the ADR is higher than the pre-specified limit.

11. The peer of claim 7, wherein the processor is further configured to determine a sum of the obtained starting point value and the determined interval as the starting point value of the peer if the ADR is higher than the pre-specified limit.

12. The peer of claim 7, wherein the APMR is associated with a generation rate of fragments.

* * * * *